July 12, 1955  F. PAVLIK, JR., ET AL  2,712,762
SPEED MAINTENANCE DEVICE FOR MOTOR VEHICLES
Filed Jan. 2, 1952
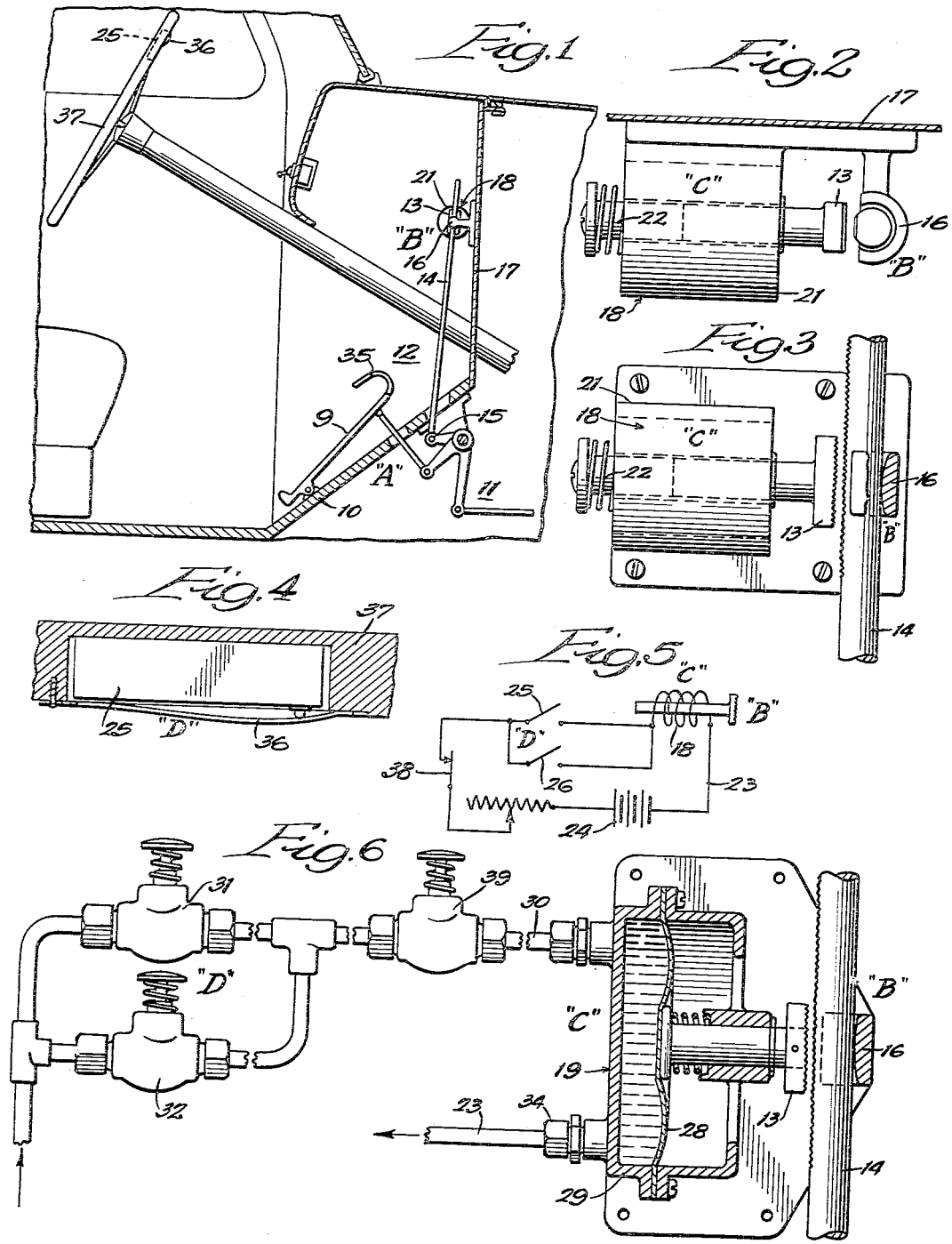
INVENTORS:
Frank Pavlik Jr. and
Roy D. Pavlik,
BY
ATTORNEY.

:::fig
United States Patent Office 2,712,762
Patented July 12, 1955
:::

2,712,762
SPEED MAINTENANCE DEVICE FOR MOTOR VEHICLES

Frank Pavlik, Jr., Wilmette, and Roy D. Pavlik, Kenilworth, Ill.

Application January 2, 1952, Serial No. 264,422

10 Claims. (Cl. 74—541)

As is well known the speed of a motor vehicle is controlled by the alteration of the carburetor through the control of a treadle, such control mechanism being usually referred to as the accelerator. In long distance driving with a more or less straightaway highway the treadle is held depressed to maintain the speed constant. Such uninterrupted depression of the treadle often produces ennui or leg fatigue, not infrequently to the extent of causing drowsiness to overtake the driver with a consequent momentary loss of consciousness. Obviously, this creates a hazard not only to the driver of the vehicle involved but to others on the highway. Various devices have been proposed for enabling such a long distance driver to maintain the desired speed of the vehicle while the foot is temporarily freed from its constant pressure on the accelerator treadle. Generally, these devices have involved either an auxiliary treadle for the other foot or a hand-controlled lever on or adjacent to the steering wheel. However, these devices have not proved to be practical solutions of the problem.

The main objects of this invention, therefore, are to provide an improved form of device auxiliary to the accelerator treadle of motor vehicles for maintaining a constant speed of the vehicle; to provide an improved auxiliary device of this kind which may be held in its speed-maintaining position by either the hand or the foot other than the one normally used for operating the accelerating treadle; to provide an improved speed-maintaining device of this kind which will cause the treadle to automatically restore the carburetor to idling speed the instant pressure is removed from the auxiliary control; to provide improved means, actuated by the vehicle's brake and/or clutch treadle, to neutralize the speed-maintenance device; to provide an improved device of this kind which may employ electrical current or fluid pressure, such as oil or a vacuum, as the exerting force for the auxiliary control; and to provide a device of this kind which is so simple in construction as to be very economical to manufacture and which may be readily installed in a motor vehicle now in use or included in the manufacture thereof at the factory.

In the accompanying drawings:

Fig. 1 is a side view, partially sectional, of a portion of a motor vehicle showing this improved auxiliary, speed-maintenance device as applied to the conventional foot-treadle accelerator control;

Figs. 2 and 3 are enlarged, plan and elevation views of a brake element for a device of this kind;

Fig. 4 is an enlarged, fragmentary detail of the steering wheel showing the arrangement of a microswitch and its control button;

Fig. 5 is a more or less diagrammatic view, showing the arrangement of an electrical controlled brake means whereby the accelerator treadle is held in a shifted position for the maintenance of a predetermined speed of the vehicle; and Fig. 6 is a similar view, showing a fluid pressure control for a device of this kind.

The essential concept of this invention involves a normally retracted, manually-activatable, pressure-exerting brake element positioned to engage some movable part of the motor-vehicle foot-treadle accelerator mechanism so as to retain the foot-treadle in a shifted position and thereby maintain constant the travel speed of the vehicle.

A motor-vehicle, speed maintenance device, for use with the usual foot-treadle, speed-accelerator mechanism "A," comprises a treadle-retaining brake means "B," a pressure-exerting means "C," and a manual-control means "D."

The foot treadle, speed-accelerator mechanism "A" is a conventional construction involving a treadle 9 hinged on the vehicle floor 10 with a connection 11 leading to the carburetor (not shown).

The treadle-retaining brake means "B," as herein shown, comprises a supplemental connection 12 with which a brake shoe 13 coacts to releasably retain the treadle 9 in a shifted position for maintaining the speed of the vehicle as determined by the shifting of the treadle 9.

The supplemental connection 12 involves a rod 14 suitably hinged at 15 to the foot-treadle 9 with the upper end of the rod 14 slidably supported in a guide bracket 16 here shown as being secured to the vehicle dashboard 17. The brake shoe 13, as herein shown, is a substantially T-shaped member positioned so that the face of the transverse portion is adapted to press the rod 14 against the bracket 16 to effect the desired speed maintenance.

The pressure-exerting means "C" may be any of the several possible forms for effecting an axial shifting of the brake shoe 13. Two such possible forms are indicated in the drawings, one electrical 18, and the other fluid 19.

The electrical, pressure exerting means 18 comprises a conventional armature-solenoid 21, the spring-retracted armature 22 of which has the stem of the T-shaped brake shoe 13 either integrally formed thereon or rigidly attached to the outer end thereof. The solenoid 21 is mounted on the vehicle frame suitably adjacent the supplemental connection 12 and is connected by a suitable circuit 23 to the vehicle battery 24.

The fluid pressure-exerting means 19 employs a diaphragm 28 suitably connected to the stem of the spring-retracted brake shoe 13. The diaphragm 28 is supported in a housing 29 so as to be activated in the well-known manner by the pressure differential on opposite sides thereof. As with the solenoid 21, the housing 29 would be suitably attached to the vehicle frame adjacent the supplemental connection 12 with which the brake shoe 13 functions. The activating fluid may be either oil or vacuum. A conduit 30 would connect a chamber in the housing 29 on one side of the diaphragm 28 with either the vehicle oil pressure system or with its vacuum system. In case of oil pressure a return conduit 23 would connect the housing 29 to the vehicle oil system.

In order to provide for the proper pressure differential on opposite sides of the diaphragm, sufficient to effect the desired movement of the brake shoe 13, a conventional adjustable valve 34 is suitably arranged on the housing 29. In the oil pressure system this valve 34 would be so arranged as to control the oil pressure to the diaphragm. In the vacuum system the valve 34 would be arranged to act as a vent to control the pressure differential. In either case, the adjustment of the valve 34 would determine the pressure of the brake shoe 13 on the rod 14.

The manual-control means "D" for the electrical or fluid-actuated brake shoe 13, comprises a switch 25 or a valve 31 arranged on the steering wheel 37 for control by a hand-activated button 36. If desired, a second switch 26 and a second valve 32 may be positioned for activation by the foot other than the one normally used with the acceleration treadle 9. In either case, the switch or the valve—and its control button—is normally retracted so that the pressure-exerting means "C" is immobile. Accordingly, it requires some conscious effort on the part of the driver not only to initiate the activation of the switch or valve but to retain it activated. As soon as there is any relaxation—conscious or unconscious—of that activating effort on the part of the driver of the vehicle, the pressure-exerting means "C" will be restored to its normal immobile condition, thereby insuring the normal functioning of the speed accelerator.

The control button 36 for the switch 25 or the valve 31 is arranged on the under side of the steering wheel 37 preferably on the right of a diameter transverse to the line of vehicle travel on the straightaway. The button 36 would be comparatively small and so shaped and so embedded in the steering wheel 37 that in the normal use of the steering wheel 37 the button 36 would not be activated in any way. However, when it was desired to consciously activate the switch 25 or the valve 31 the button 36 could be depressed by the fingers of the right hand as the hand gripped the wheel in the normal manner. This generally would occur only when travel was on a more or less straight section of highway so that there would be little if any necessity for a material turning of the steering wheel 37. Hence, it would be quite convenient for the driver to maintain the button 36 depressed as long as desired. However, as conditions required some special attention to vehicle manipulation a release of the button 36 would restore vehicle control conditions to normal.

For the electrical pressure-exerting means 18 the switch 25 preferably would be a conventional micro switch juxtaposed to the button 36. For the fluid pressure-exerting means 19 the valve 31 would be a conventional, small structure juxtaposed to the control button 36. Similarly, the switch 26 and the valve 32, when used, would have associated therewith a control button for activation by the foot.

Although the brake shoe 13 and its pressure-exerting means 18 or 19 are here shown mounted on the vehicle dashboard 17 within the driver's compartment, it will be understood that these parts could be arranged under the motor hood either in association with the connection 11 or with some supplemental moving part on the carbureter itself. Thus, it is the provision of these particular parts, rather than their positioning, that constitutes the essence of the instant invention.

In order to permit the freedom of operation of the foot-treadle 9 to decelerate the vehicle speed when the brake shoe 13 is being applied, a toe clip 35 is formed on or attached to the forward end of the foot treadle 9. As is apparent, this will permit the elevation of the foot-treadle against the action of the brake shoe 13 thus reducing the speed of the vehicle to a new point of maintenance.

A further feature of this speed-maintenance device is a provision against having the brake 13 held in its speed-maintaining position in the event the vehicle brake or clutch treadle is depressed by the driver when his hand remains on the control button 36. To that end an auxiliary switch 38 or valve 39 is located in the circuit 23 or the fluid conduit 30 respectively with suitable operative connections so arranged that either the vehicle brake treadle or clutch treadle would open the electrical circuit 23 to the solenoid 21 or cut off the fluid pressure in the conduit 30 and thereby neutralize the pressure-exerting means "C." Thus, if the driver used either one of his feet to effect the normal depression of the vehicle brake or clutch treadles, at a time when his hand held depressed the control button 36, the brake 13 would be released and the engine would be restored to idling speed.

The operation of this speed maintenance device is substantially as follows:

When one is driving a vehicle and has a long-distance, more or less straight highway ahead of him, the pressing of the foot-treadle 9 will bring the vehicle up to the desired speed. The driver could then grip the control button 36 for the switch 25 or the valve 31 on the steering wheel 37 of the vehicle. This would activate the pressure-exerting means "C" so that the brake shoe 13 would be pressed to contact the rod 14 against the bracket 16. Thereupon the carbureter would be held in the speed-producing position to which it was shifted by the foot treadle 9. The control button 36, for the switch 25 or the valve 31, being thus held by the hand on the steering wheel 37 the operator could remove his foot from the treadle 9 and the vehicle would continue to maintain the speed as determined by the previous shifting of the treadle 9. Moreover, the vehicle would continue at that speed so long as the operator maintained his grip on the control button 36. If for any reason, such as becoming drowsy and, perhaps, momentarily losing consciousness, the operator should relax his grip on the control button 36 the pressure on the brake shoe 13 would be instantly removed which would result in the carburetor being restoed to its position for the idling speed of the vehicle. If subsequently the operator desired to restore the vehicle to a particular speed it would be necessary for him to replace his foot on the treadle 9 and again bring the vehicle up to the desired speed whereupon a conscious resumption of a grip of the control button 36 would permit him to again maintain the speed of the vehicle and again permit the foot to be removed from the treadle 9.

If the car were equipped with the second switch 26 or the second valve control 32, with an appropriately arranged control button, the maintenance of the speed could be effected by the foot other than the one that is normally used for controlling the accelerator treadle.

We claim:
1. In combination with a foot-treadle motor-vehicle accelerator mechanism, a shiftable member connected to the foot-treadle, a brake element positioned adjacent the member and normally-retracted from braking engagement therewith, pressure-responsive means connected to the brake element to effect movement thereof to engage the member and yieldingly lock it in any position between the limits of its shifting for maintaining constant a predetermined speed of the vehicle as determined by the shift of the foot-treadle, manual control means for activating the pressure-responsive means for effecting the braking action of the element, and means on the foot-treadle engageable by the operator's foot for retracting the foot-treadle during the braking action of the element.

2. A device for use with the accelerator mechanism of a motor vehicle comprising, a normally-retracted brake element positionable for movement into and out of engagement with a shiftable part of the accelerator mechanism for yieldingly locking it at any point between the limits of its normal shifting for maintaining constant a predetermined speed of the vehicle, activatable means for shifting the brake element into and releasably holding it in its accelerator-engaging position, and a single member normally-retracted and manually-operable for directly activating and releasing the last-mentioned means, the member maintaining the aforesaid means activated only so long as the member is manually retained in its shifted position.

3. A device for use with the accelerator mechanism of a motor vehicle comprising, a normally-retracted brake element positionable for movement into and out of engagement with a shiftable part of the accelerator mechanism for yieldingly locking it at any point between the limits of its normal shifting for maintaining constant a predetermined speed of the vehicle, activatable pressure-responsive means connected to the brake element and normally-biased to retract the brake element, and a single member normally-retracted and manually-operable for directly activating and releasing the last-mentioned means, the member maintaining the aforesaid means activated only so long as the member is manually retained in its shifted position.

4. A device for use with the accelerator mechanism of a motor vehicle comprising, a normally-retracted brake element positionable for movement into and out of engagement with a shiftable part of the accelerator mechanism for yieldingly locking it at any point between the limits of its normal shifting for maintaining constant a predetermined speed of the vehicle, activatable pressure-responsive means connected to the brake element and normally-biased to retract the brake element, and two members each normally-retracted and either member manually-operable independently of the other for directly activating and releasing the last-mentioned means, the operated member maintaining the aforesaid means activated only so long as the member is manually retained in its shifted position, one of the members being arranged on the vehicle steering wheel for hand control and the other member being located on the vehicle floor for foot control.

5. A device for use with the accelerator mechanism of a motor vehicle comprising, a normally-retracted brake element positionable for movement into and out of engagement with a shiftable part of the accelerator mechanism for yieldingly locking it at any point between the limits of its normal shifting for maintaining constant a predetermined speed of the vehicle, activatable pressure-responsive means connected to the brake element and normally-biased to retract the brake element, and two members each normally retracted and either member manually-operable independently of the other for directly and oppositely activating the pressure-responsive means, the operated member maintaining the aforesaid means activated only so long as the member is manually retained in its shifted position.

6. A device for use with the accelerator mechanism of a motor vehicle comprising, a normally-retracted brake element positionable for movement into and out of engagement with a shiftable part of the accelerator mechanism for yieldingly locking it at any point between the limits of its normal shifting for maintaining constant a predetermined speed of the vehicle, means normally retracting the brake element, a single solenoid connected to effect the movement of the brake element against the retracting means, a circuit connecting the solenoid with a source of electrical energy, and a single switch button normally-retracted and manually-operable for directly and successively energizing and de-energizing the solenoid, the switch button maintaining the solenoid energized only so long as the switch button is manually retained in its shifted position.

7. A device for use with the accelerator mechanism of a motor vehicle comprising, a normally-retracted brake element positionable for movement into and out of engagement with a shiftable part of the accelerator mechanism for yieldingly locking it at any point between the limits of its normal shifting for maintaining constant a predetermined speed of the vehicle, means normally retracting the brake element, a single solenoid connected to effect the movement of the brake element against the retracting means, a circuit connecting the solenoid with a source of electrical energy, and a single switch button normally-retracted and manually-operable for directly and successively energizing and de-energizing the solenoid, the switch button being arranged on the steering wheel for depression by the operator's hand to energize the solenoid so long as the switch button is held depressed by the hand, the switch button becoming inoperative as soon as the hand is released.

8. A device for use with the accelerator mechanism of a motor vehicle comprising, a normally-retracted brake element positionable for movement into and out of engagement with a shiftable part of the accelerator mechanism for yieldingly locking it at any point between the limits of its normal shifting for maintaining constant a predetermined speed of the vehicle, means normally retracting the brake element, a fluid-pressure diaphragm connected to the brake element, a fluid circuit connecting the diaphragm with a source of pressure for shifting the brake element against the retracting means, and two pressure-control members arranged in parallel in the fluid circuit each member normally-retracted and either member manually-operable independently of the other for directly controlling the fluid pressure on the diaphragm, the operated member maintaining the pressure on the diaphragm only so long as the member is manually retained in its shifted position.

9. In combination with a motor vehicle accelerator mechanism, a normally retracted brake element positioned and operable to engage some part of the accelerator mechanism to yieldingly hold it at any point between the limits of its normal shifting for maintaining constant a predetermined speed of the vehicle, activatable means for shifting the brake element into and releasably holding it in its accelerator-engaging position, and a single member normally-retracted and manually-operable for directly and successively activating and releasing the last-mentioned means, the member maintaining the aforesaid means activated only so long as the member is manually retained in its shifted position.

10. In combination with a motor vehicle accelerator mechanism, a normally-retracted brake element positioned and operable to engage some part of the accelerator mechanism to yieldingly hold it at any point between the limits of its normal shifting for maintaining constant a predetermined speed of the vehicle, activatable pressure-responsive means connected to the brake element to effect the movement thereof, and a single member normally-retracted and manually-operable for directly and successively activating and releasing the last-mentioned means, the member maintaining the aforesaid means activated only so long as the member is manually retained in its shifted position.

References Cited in the file of this patent

UNITED STATES PATENTS

| | | |
|---|---|---|
| 2,021,832 | Callihan | Nov. 19, 1935 |
| 2,159,772 | Schroedter | May 23, 1939 |
| 2,479,646 | Smith | Aug. 23, 1949 |
| 2,487,606 | Smith | Nov. 8, 1949 |
| 2,554,619 | Goik | May 29, 1951 |